United States Patent [19]

Blair

[11] 4,090,596

[45] May 23, 1978

[54] TEMPERATURE RESPONSIVE FAN DRIVE COUPLING

[75] Inventor: Everett George Blair, Plainfield, Ind.

[73] Assignee: Wallace Murray Corporation, New York, N.Y.

[21] Appl. No.: 762,713

[22] Filed: Jan. 26, 1977

[51] Int. Cl.² ............ F16D 35/00; F16D 43/25
[52] U.S. Cl. ............ 192/58 B; 192/82 T; 337/372
[58] Field of Search ........ 192/58 A, 58 B, 58 R, 192/58 C, 82 T; 219/253, 265, 413, 449, 450, 494, 512; 337/372; 60/529; 29/513, 514

[56] References Cited

U.S. PATENT DOCUMENTS

| 3,179,221 | 4/1965 | Weir | 192/58 B |
| 3,191,733 | 6/1965 | Weir | 192/58 B |

Primary Examiner—Milton S. Mehr
Attorney, Agent, or Firm—Thomas J. Greer, Jr.

[57] ABSTRACT

A shear liquid fan drive coupling for the radiator cooling system of an internal combustion engine of the type wherein a temperature responsive valve controls the degree of rotary coupling between the engine and a radiator cooling fan by controlling the active quantity of shear liquid in a liquid coupling between the engine and the fan. The specific improvement relates to a bi-metal strip for the temperature controlled fluid coupling, the strip being so configured that it cannot be mounted on the housing of the coupling except in a predetermined orientation therewith. In this manner, overheating of the engine due to faulty mounting of the bi-metal strip is precluded.

3 Claims, 3 Drawing Figures

U. S. Patent    May 23, 1978    4,090,596
FIG. 1.
FIG. 2.
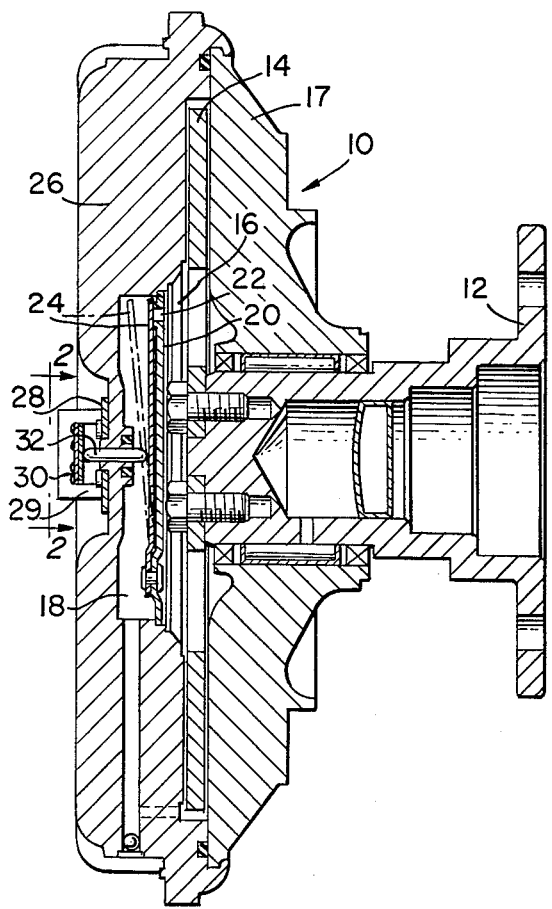
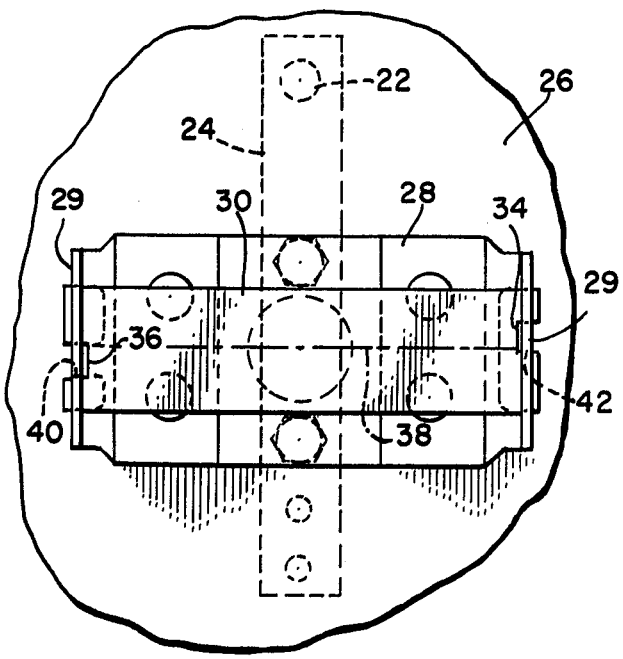
FIG. 3.
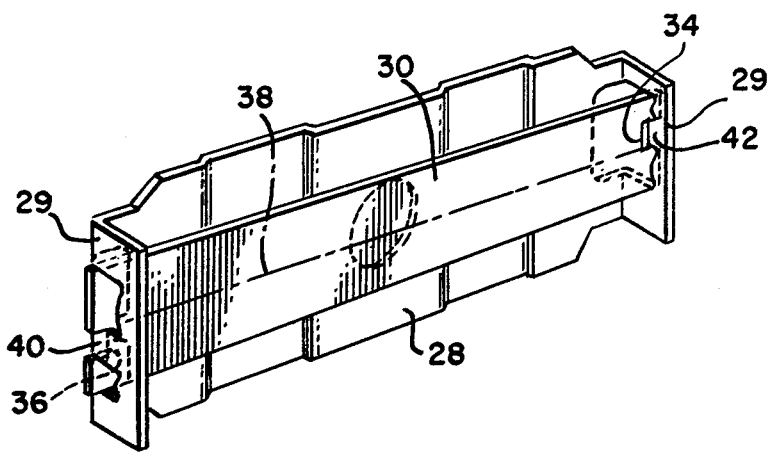

TEMPERATURE RESPONSIVE FAN DRIVE COUPLING

This invention relates to a viscous liquid fan drive for the radiator cooling system of an internal combustion engine. Such fan drives are well known and usually include a rotary drive disc which is driven by the engine. The drive disc is rotatably mounted within a housing or casing, with the casing carrying the blades of a fan. A quantity of viscous liquid, often termed a shear liquid, is admitted from a reservoir chamber to a drive chamber, the rotary disc being positioned in the drive chamber. Depending upon the amount of the shear liquid in the driving chamber the degree of rotary coupling between the driving rotor and the fan is varied. This variance is usually controlled by a temperature responsive valve assembly, the valve opening to admit a larger quantity of fluid when high cooling requirements are called for, and closing to limit the degree of rotary coupling when lower cooling requirements exist. Such assemblies include a passageway for the shear liquid between the radially outermost portion of the drive chamber in which the drive rotor is positioned and the reservoir chamber. The shear liquid is deflected so as to flow from the radially outermost part of the drive chamber through the passageway and thence to the reservoir chamber. Such devices are well known, and are presently classified in Class 192, Subclass 58 of the United States Patent Office classification. Such devices are further described in Society of Automotive Engineers publication 740,596 of Aug. 12-16, 1974, by Everett G. Blair, hereby incorporated by reference. In general, such devices lower the power lost to the radiator cooling fan by correlating the fan power requirement with the engine cooling requirement at various engine speeds and ambient temperatures.

The temperature responsive valve assembly usually employs a bi-metal strip to determine the position of the valve, such position in turn controlling the amount of shear liquid which rotatably couples the engine power to the fan. Examples of bi-metal strip constructions of this type are afforded by the structures described in U.S. Pat. Nos. 3,179,221 and 3,191,733 to Weir, hereby incorporated by reference. The bi-metal strip must be properly oriented relative to the valve which it controls. Thus, when the bi-metal bows in one direction, it actuates the valve towards one position. Bowing of the bi-metal strip in the opposite direction actuates the valve toward the opposite position. In the usual valve assembly arrangement, lower engine ambient temperatures cause the bi-metal to bow in a direction to close the valve, higher engine ambient temperatures causing the opposite bowing direction and opposite valve action, i.e., the valve is opened.

In the assembly and in the repair of such temperature controlled fluid couplings, it is hence necessary that the bi-metal strip be properly oriented with respect to the valve. Thus, if high engine temperatures call for maximum shear liquid coupling to thereby effect maximum radiator cooling by the fan, improper bi-metal placement may result in engine overheating. If, for example, the bi-metal bows to close the valve at high engine temperatures, instead of (correctly) bowing in a direction to open the valve, radiator cooling by the fan will be less than required and engine damage may occur.

According to the practice of this invention, a bi-metal strip is so configured than an incorrect placement or assembly of the bi-metal strip on the housing of the fluid coupling cannot be made and thereby cause heating of the engine due to insufficient cooling action by the fan on the radiator. This is accomplished by providing the ends of the bi-metal strip with mounting notches so arranged that only a desired, predetermined placement is possible.

IN THE DRAWINGS

FIG. 1 is a cross-sectional view of a typical temperature controlled fluid coupling provided with the bi-metal strip configuration according to this invention.

FIG. 2 is a view taken along line 2—2 of FIG. 1.

FIG. 3 is a partial perspective view showing the bi-metal strip mounted on a portion of the coupling.

Referring now to the drawings, the numeral 10 denotes generally a typical temperature controlled fluid coupling for coupling the engine to the fan. The numeral 12 denotes a shaft adapted to be connected to a belt member, such as a pulley, in turn driven by the engine. The reader will understand that the radiator is to the left of the illustrated coupling 10. The numeral 14 denotes a drive disc coupled to shaft 12, the disc rotating in drive chamber 16 of fluid coupling housing 17, the housing being of a conventional construction. The housing carries a plurality of fan blade, not illustrated. The numeral 18 denotes a reservoir chamber which contains a quantity of shear liquid such as a silicone liquid. The numeral 20 denotes a partition which separates the drive chamber 16, in which the drive rotor 14 rotates, and reservoir chamber 18. The numeral 22 denotes a valve aperture in partition 20, the aperture adapted to be opened or closed by the action of valve flapper member 24, normally biased in the valve open position. Numeral 26 denotes a cover to which a bracket 28 is attached. The numeral 28 denotes the bracket having upstanding ear portions 29 at each end thereof, the ear portions receiving the ends of a bi-metal strip 30. The numeral 32 denotes an elongated rod for actuating flapper 24.

The normal operation of the device shown at FIG. 1 is as follows. When engine temperatures are relatively high, maximum radiator cooling is required, this in turn requiring maximum liquid coupling between the input shaft 12 and the coupling housing 17 which carries the fan blades. Bi-metal 30, in response to higher temperatures, bows towards the left as viewed at FIG. 1, thereby opening aperture 22 of partition 20 and providing a maximum quantity of shear liquid in drive chamber 16 in a manner known to workers in this art. Thus, maximum shear liquid coupling between drive rotor 14 and housing 17 is realized. Contrariwise, relatively lower engine temperatures permit a lesser rotation of the fan (with consequent saving of engine power), the bi-metal strip 30 bowing to the right as viewed at FIG. 1 to thereby close aperture 22. Such closure results in less shear liquid in driving chamber 16, with relatively greater slippage between input shaft 12 and the fan.

Referring now to FIG. 3 of the drawings, the configuration of bi-metal 30 on mounting bracket 28 is illustrated in detail. The numeral 34 denotes a notch at one end of bi-metal strip 30, while numeral 36 denotes a corresponding notch at the other end. The numeral 38 denotes the longitudinal axis or center-line of the bi-metal and the reader will note that notches 34 and 36 are, respectively, located on opposite sides of median 38. Notch 36 receives portion 40 of ear mounting 29, while notch 34 receives portion 42 of opposite ear mounting 28. The mid-portion of the bi-metal strip 30 urges rod 32 towards the flapper 24, while the bias of the flapper urges the rod against the bi-metal. Thus, bowing of the bi-metal in response to ambient temperature changes moves the flapper. From a consideration of FIG. 3, the reader will observe that it is not possible to place bi-metal strip 30 on mounting bracket 28 except in the position indicated. In this manner, proper orientation of the bimetal strip relative to the valve and other elements of the fluid coupling is always enjoyed. While bi-metal 30 at FIG. 3 appears as of one metal sheet, it is a laminate of two different metals, each metal having a different coefficient of thermal expansion. Thus, so long as the desired metal faces away from the pin 32, the bi-metal element will bow in the intended direction with temperature changes.

I claim:

1. A temperature controlled fluid coupling adapted to couple a radiator cooling fan of an internal combustion engine to the engine to thereby rotate the fan, the fluid coupling being of the type including a housing having a drive chamber into which a rotor both extends and is positioned, a shear liquid reservoir chamber in the housing, the reservoir chamber communicating with the drive chamber through a temperature controlled valve, the amount of valve opening determining the degree of rotary coupling between the engine and the fan, the valve in one position establishing maximum rotary coupling, a bi-metal laminate mounted on the housing and actuating the valve, bowing of the bi-metal laminate in one direction due to changes in its ambient temperature causing the valve to open and bowing of the laminate in the opposite manner causing the valve to close, the improvement comprising, means for mounting the bi-metal laminate on the housing in a desired, predetermined orientation relative to the valve, whereby mounting of the bi-metal laminate on the housing is possible only when the bi-metal is oriented with respect to the housing in the predetermined manner.

2. The temperature controlled fluid coupling of claim 1 wherein the bi-metal laminate is provided with notches on its periphery for mounting it on the housing, the mounting notches cooperating and receiving mounting ears on the housing.

3. The temperature controlled fluid coupling of claim 2 wherein the bi-metal laminate is in the shape of a rectangular strip, each end of the bi-metal strip carries one notch, the notches being on opposite sides of the longitudinal axis of the bi-metal strip.

* * * * *